No. 894,668. PATENTED JULY 28, 1908.
O. O. KRUH.
SYSTEM OF ELECTRICAL DISTRIBUTION.
APPLICATION FILED FEB. 15, 1907.
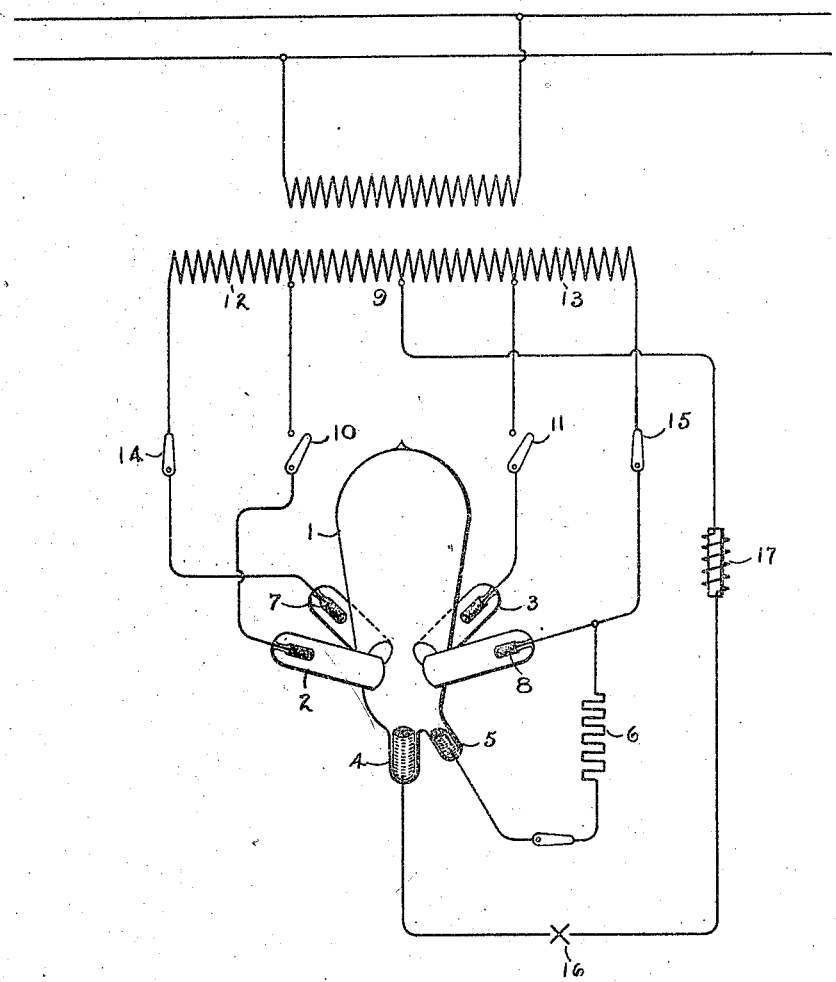
WITNESSES:
INVENTOR
OSIAS O. KRUH.
BY
ATT'Y.

UNITED STATES PATENT OFFICE.

OSIAS O. KRUH, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

No. 894,668.

Specification of Letters Patent.

Patented July 28, 1908.

Application filed February 15, 1907. Serial No. 357,456.

*To all whom it may concern:*

Be it known that I, OSIAS OTTO KRUH, a subject of the Emperor of Austria-Hungary, residing at Schenectady, county of Schenectady, State of New York, have invented certain new and useful Improvements in Systems of Electrical Distribution, of which the following is a specification.

My invention relates to systems for electrical distribution in which vapor electric devices are operated.

Vapor electric devices may be used in a well known manner for rectifying alternating current and delivering direct current to a load circuit. Such a rectifier, as usually constructed, comprises a plurality of anodes and a single cathode inclosed in an evacuated envelop. The anodes receive energy from the secondary of an alternating current transformer, and the cathode delivers direct current to the load circuit. The voltage on the load circuit can be decreased by the introduction of a reactance in the primary circuit of the transformer supplying the rectifier, though the power factor of the system is somewhat lowered by the use of this reactance. It is not, however, so easy or convenient to raise the voltage on the load circuit above its normal value, provided the system is maintained at a high power factor when operating under normal conditions.

My present invention comprises means for changing the voltage on the load by a certain amount without changing the voltage on the main anodes of the rectifier and without introducing reactance or resistance in series with the primary of the transformer. In general, the regulating effect is produced by shifting the arc of the rectifier tube from the main anodes to the auxiliary anodes, the latter receiving current at higher voltage than that supplied to the main anodes.

The accompanying drawing illustrates one application of my invention to practice.

The rectifier tube comprises the usual evacuated envelop 1 having radial anode arms 2 and 3, and a mercury cathode 4. The rectifier is also provided with a starting anode 5 supplied with current through a resistance 6. The arrangement and operation of the elements above enumerated are well understood by persons skilled in the art. In addition to these elements the rectifier is provided with auxiliary anode arms containing anodes 7 and 8. The main anodes receive current from the secondary 9 of a transformer and may be connected therewith through switches 10 and 11. This transformer may be of the well known constant current type giving constant secondary current. The main winding of the transformer secondary is connected directly across the main anodes of the rectifier, but the transformer secondary is provided with auxiliary turns 12 and 13 wound on the same core and serving to step up the voltage to a total considerably higher than normal secondary voltage. This total voltage may be applied directly across the auxiliary anodes 7 and 8 through suitable switches 14 and 15. In the drawing the load circuit of the rectifier has been indicated diagrammatically at 16, but it will be understood that the load may consist of arc lamps or of other well known translating devices. A reactance 17 may be used to assist in causing overlap of the current waves to keep the rectifier alive.

When the rectifier is started on the auxiliary anodes 7 and 8 the voltage supplied to the load circuit is of high value and exceeds the normal running voltage by a value dependent on the number of auxiliary turns 12 and 13 of the transformer secondary. If desired, these auxiliary turns may be made of small cross-section and therefore of small cost, but in that case the auxiliary turns should be used only temporarily as in starting; otherwise they might be heated unduly by the passage of current.

It will be readily understood that the rectifier may be shifted from high voltage to a lower voltage by the aid of switches 10, 11, 14 and 15. To secure a transfer of the vapor arc from anodes 7 and 8 to anodes 2 and 3, it is only necessary to close switches 10 and 11 and open switches 14 and 15. This change is, of course, accompanied by a decrease in the load voltage. An increase in voltage can similarly be produced by shifting back from the main anodes to the auxiliary anodes.

The readiness with which the change in load voltage can be effected, and the good power factor of the system under all conditions, render the system well adapted for commercial operation, particularly in connection with load circuits which, from time to time vary in resistance, or which have a starting resistance considerably higher than the normal running resistance.

What I claim as new and desire to secure by Letters Patent of the United States, is,—

1. The combination of a vapor rectifier, main anodes therefor, a load circuit connected to said rectifier, a transformer connected with said main anodes, auxiliary anodes for said rectifier, and means for varying the voltage on the load by shifting the arc between said main anodes and said auxiliary anodes.

2. The combination of a vapor arc rectifier having a plurality of pairs of anodes and a cathode, a load circuit connected to said cathode, and means for materially varying the voltage of the load current by shifting the arc of said rectifier from one pair of anodes to another.

3. The combination of a vapor arc rectifier having a plurality of pairs of anodes and a cathode, a load circuit connected to said cathode, a source of potential connected across one pair of anodes, and means for applying a lower potential to another pair of anodes to decrease the voltage of the load current.

4. The combination of a load circuit, a vapor arc rectifier delivering current thereto, anodes for said rectifier, and means for varying the voltage on said load circuit by shifting the vapor arc from one pair of anodes to another.

5. The combination of a load circuit, a vapor rectifier connected therewith, anodes for said vapor rectifier connected with the secondary of a transformer, a connection between said secondary and one side of said load circuit, auxiliary anodes for said rectifier, and means for connecting said auxiliary anodes with auxiliary turns on said transformer secondary.

6. The combination of a load circuit, a vapor rectifier connected therewith having a plurality of pairs of anodes, a transformer for supplying energy to said rectifier, connections for delivering normal potential to one pair of said anodes, and connections by which abnormal potential may be delivered to another pair of said anodes to change the voltage on said load circuit.

7. The combination of a transformer primary, a secondary for said transformer having a central tap and auxiliary turns, a vapor rectifier receiving energy from said transformer secondary, a load circuit connected between said rectifier and said central tap, main anodes for said rectifier, additional anodes for said rectifier, and means for connecting said additional anodes with the auxiliary turns of said secondary.

In witness whereof, I have hereunto set my hand this 13th day of February, 1907.

OSIAS O. KRUH.

Witnesses:
HELEN ORFORD,
MARGARET E. WOOLLEY.